United States Patent
Imada et al.

(10) Patent No.: US 7,636,214 B2
(45) Date of Patent: Dec. 22, 2009

(54) STRUCTURE, OPTICAL DEVICE, MAGNETIC DEVICE, MAGNETIC RECORDING MEDIUM AND MANUFACTURING METHOD THEREOF

(75) Inventors: Aya Imada, Yokohama (JP); Tohru Den, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 879 days.

(21) Appl. No.: 10/540,575

(22) PCT Filed: Feb. 6, 2004

(86) PCT No.: PCT/JP2004/001281

§ 371 (c)(1),
(2), (4) Date: Jun. 24, 2005

(87) PCT Pub. No.: WO2004/070709

PCT Pub. Date: Aug. 19, 2004

(65) Prior Publication Data
US 2006/0087758 A1    Apr. 27, 2006

(30) Foreign Application Priority Data
Feb. 7, 2003    (JP) .............................. 2003-031481

(51) Int. Cl.
*G11B 5/09*    (2006.01)
(52) U.S. Cl. .................. 360/48; 360/131; 369/275.4
(58) Field of Classification Search .................. None
See application file for complete search history.

(56) References Cited

U.S. PATENT DOCUMENTS 5,851,643 A * 12/1998 Honda et al. .................. 428/212
6,086,974 A *  7/2000 Thiele et al. .............. 428/832.1
6,139,713 A    10/2000 Masuda et al. .............. 205/206
6,345,021 B1 * 2/2002 Belser et al. ................ 369/47.1

(Continued)

FOREIGN PATENT DOCUMENTS

JP    11-224422    8/1999

(Continued)

OTHER PUBLICATIONS

Aug. 25, 2005 International Preliminary Report on Patentability in PCT/JP2004/001281.

(Continued)

*Primary Examiner*—Jason C Olson
(74) *Attorney, Agent, or Firm*—Fitzpatrick, Cella, Harper & Scinto

(57) ABSTRACT

A nano structure having pore array structures in which a plurality of periodic arrays are formed adjacent to one another and a method of manufacturing the nano structure are provided. A nano structure having periodic array structures of pores formed in an anodized oxide film with a plurality of types of the periodic array structures arranged adjacent to one another is provided. Furthermore, a method of manufacturing a nano structure in which a plurality of periodic array structures formed in an anodized oxide film having different periods are arranged adjacent to one another, including (1) a step of forming pore starting points made up of a plurality of types of periodic arrays on the surface of a substrate comprised of aluminum as a principal component and (2) a step of anodizing the substrate simultaneously at the same anodization voltage is provided.

17 Claims, 4 Drawing Sheets

U.S. PATENT DOCUMENTS

| | | | |
|---|---|---|---|
| 6,852,431 B2* | 2/2005 | Fukutani et al. | 428/826 |
| 6,858,319 B2* | 2/2005 | Yasui et al. | 428/611 |
| 6,936,854 B2* | 8/2005 | Iwasaki et al. | 257/81 |
| 7,349,242 B2* | 3/2008 | Den | 365/158 |

FOREIGN PATENT DOCUMENTS

| | | | |
|---|---|---|---|
| JP | 11224422 A | * | 8/1999 |

OTHER PUBLICATIONS

Patent Abstracts of Japan, vol. 1999, No. 13, Nov. 30, 1999 (JP-A 11-224422, Aug. 17, 1999).

Jul. 16, 2004 International Search Report in PCT/JP2004/001281.

Jul. 16, 2004 Written Opinion in PCT/JP2004/001281.

* cited by examiner

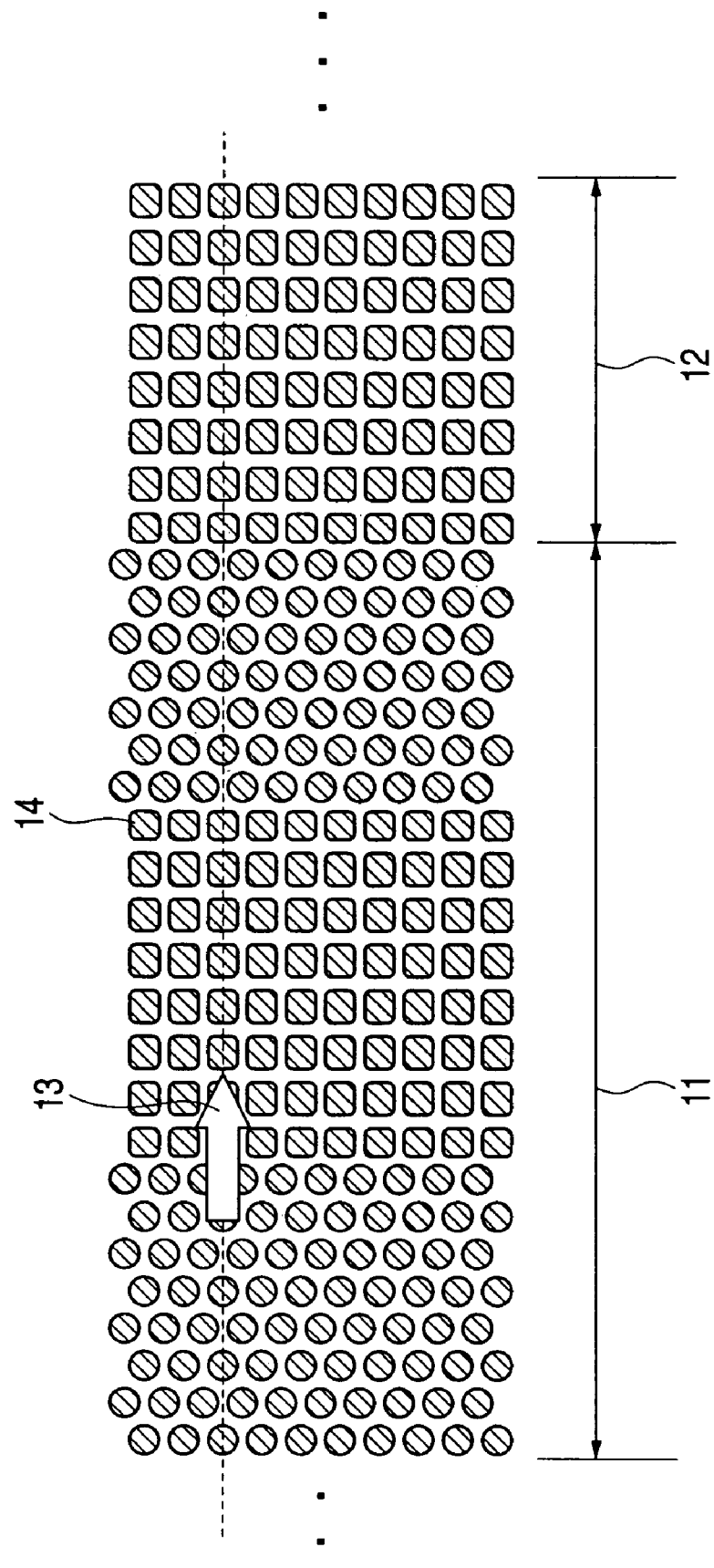

STRUCTURE, OPTICAL DEVICE, MAGNETIC DEVICE, MAGNETIC RECORDING MEDIUM AND MANUFACTURING METHOD THEREOF

TECHNICAL FIELD

The present invention relates to a structure having concavo-convex structures on the order of nanometers arranged at intervals on the scale of nanometers (hereinafter also referred to as a "nano structure"), an optical device, a magnetic device, a magnetic recording medium, and a method of manufacturing the structure.

BACKGROUND ART

As a technology of forming a nanostructure or microstructures on the surface of an object, a technology of forming pores of several hundred nm or less in size using an anodization for a film or substrate comprised of aluminum as a principal component rather than a lithography technology using light rays or electron beams is conventionally known.

The anodization method is a method applying an electric field to a substrate comprised of aluminum as a principal component as an anode in an acid bath oxidation and a dissolution phenomenon and form pores on the surface of the substrate. These pores are formed straightforward in the vertical direction starting from the surface of the substrate, have a high aspect ratio and also have excellent uniformity in diameters of their cross sections. Furthermore, it is possible to control the diameters and spacing of pores by adjusting a current and/or voltage during anodization and control the thickness of an oxide film and depth of pores by controlling the duration of anodization, to a certain extent.

The positions of pores formed using this technique are random, but a technique for obtaining regularly arrayed pore structures is proposed in recent years. This technique forms regularly arrayed concave structures on the surface of a substrate comprised of aluminum as a principal component using an optical lithography and imprint lithography, etc., and conducts anodization using these structures as starting points of pores (U.S. Pat. No. 6,139,713).

There are proposals on various applications focused on a specific geometric structure of this anode alumina and detailed explanations are given by Masuda et al.

Examples of this include an application for a film which takes advantage of wear resistance and insulating properties of an anodized oxide film and an application for a filter with a film peeled off. Attempts are also made using a technology of filling pores with metal, semiconductor or magnetic substance or replica technology of pores for various applications including coloration, magnetic recording medium, EL light-emitting device, electrochromic device, optical device, solar cell, gas sensor, etc. Moreover, a wide variety of applications such as quantum effect devices such as quantum wire and MIM device, molecular sensor using pores as a chemical reaction field, etc., are expected.

A longitudinal recording system, which is the current mainstream of magnetic recording media, becomes more liable to demagnetization as the recording density increases and limitation of its recording density is pointed out. As an alternative technology, there is a proposal on a perpendicular magnetic recording system which records data by magnetizing a recording medium in the vertical (film thickness) direction. According to this system, the demagnetizing field decreases and a more stable state is produced as the recording density increases as opposed to the conventional longitudinal recording system. Furthermore, this system can also increase the thickness of the recording film compared to the longitudinal recording system, and therefore it is said to be resistant to thermal fluctuations in principle. There is a proposal on an application of an anodized oxide film for a perpendicular magnetic recording medium using such a perpendicular magnetic recording system (Japanese Patent Application Laid-Open No. H11-224422).

The above described nano structure is generally formed using a lithography technology and etching technology, but using such techniques, it is extremely difficult to form a high aspect structure which is realized by the anodization method.

Furthermore, the above described magnetic recording medium is disk-shaped and the rotator when information is recorded or reproduced is subject to fine vibration or eccentricity, which prevents recorded tracks from becoming concentric, producing position errors of the head and tracks. Similar position errors are also produced by deformation due to expansion of the disk caused by a thermal distribution in the apparatus. Therefore, the recording area is divided into data areas for recording information and servo areas for detecting track positions and positions are corrected while the head is detecting position information of tracks, but patterned media which are being developed in recent years have a problem as to how to construct servo areas.

The present invention has been implemented in view of the above described problems and it is an object of the present invention to improve the above described points and provide a nano structure having pore array structures in which a plurality of periodic arrays are formed adjacent to one another.

Furthermore, the present invention also provides a method of manufacturing a nano structure in which a plurality of periodic arrays are formed adjacent to one another in a short time by applying anodization to pore starting points formed on a substrate all together at one anodization voltage.

Furthermore, the present invention also provides an optical device with the pores having the nano structure filled with a dielectric having a dielectric constant.

Furthermore, the present invention also provides an optical device with the pores having the nano structure filled with a light-emitting material.

Furthermore, the present invention also provides a magnetic device with the pores having the nano structure filled with a magnetic material.

Furthermore, the present invention also provides a magnetic recording medium capable of constructing effective servo areas by filling pores having the nano structure with magnetic substance and providing a plurality of periodic array structures in the servo areas.

DISCLOSURE OF INVENTION

That is, the present invention is a structure comprising a first area having a plurality of pores which have only a first period and a second area having a plurality of pores which have only a second period, characterized in that the first area and the second area share a plurality of pores.

Furthermore, the present invention is a structure comprising periodic array structures of pores formed in an anodized oxide film, characterized in that a plurality of types of periodic array structures are arranged adjacent to one another.

The above described plurality of types of periodic array structures are preferably arranged adjacent to one another and there are preferably at least two pores in the shared region which constitutes the boundary thereof.

The above described plurality of types of periodic array structures preferably have at least one pore in addition to the pores in the shared region.

The above described plurality of types of periodic array structures each preferably have equal distances between first proximate pores or have the distance between first proximate pores on one side equal to the distance between second proximate pores on the other side or have equal distances between second proximate pores.

The distance between the most proximate pores of the above described plurality of types of periodic array structures is preferably 0.75B to 1.5B (where B is a numerical value [nm] included within the range between a maximum value and a minimum value of the distance between the most proximate pores of the above described plurality of types of periodic array structures).

According to an aspect of the present invention, there is provided a structure comprising: a first area comprising a plurality of pores which have a first period; and a second area comprising a plurality of pores which have a second period, wherein the first area and the second area own a plurality of pores in common.

According to another aspect of the present invention, there is provided a structure comprising a plurality of pore groups having a periodic array structure formed in an anodization film, wherein the pore groups is arranged adjacent to at least any one of the pore groups.

In the above structure, the pore groups are arranged adjacent to one another by owning at least two pores in common. Each of the pore groups may comprise pores not owned in common. Alternatively, the periodic array structure have a period different from the period of the adjacent pore group.

In the above structure, the distance between the most proximate pores of the plurality of types of periodic array structures are 0.75B to 1.5B (where B is a numerical value [nm] included within the range between a maximum value and a minimum value of the distance between the most proximate pores included in the plurality of types of periodic array structures).

In the above structure, the distance between the pores making up unit lattices of the plurality of types of periodic array structures are prefarably a to 2a (where a is the distance [nm] between the most proximate pores included in the plurality of types of periodic array structures)

The above described plurality of types of periodic array structures is preferably a rectangular lattice, tetragonal lattice, hexagonal lattice, graphite-shaped lattice or parallelogram lattice.

The above described anodized oxide film is preferably comprised of aluminum as a principal component.

At least one of the above described pores preferably includes a filler.

The above described filler is preferably a dielectric having a dielectric constant different from that of the above described anodized oxide film, semiconductor, magnetic material or light-emitting material.

Furthermore, the present invention is an optical device characterized in that the pores of the above described structure are filled with a dielectric having dielectric constant different from that of the above described anodized oxide film.

Furthermore, the present invention is a light-emitting device characterized in that the pores of the above described structure are filled with a light-emitting material.

Furthermore, the present invention is a magnetic device characterized in that the pores of the above described structure are filled with a magnetic material.

Furthermore, the present invention is a magnetic recording medium comprising a data area where pores filled with the above described magnetic material record information and a servo area where track positions are detected, characterized in that the structure made up of simple periodic arrays of the above described pores differs between the data area and the servo area.

At least one pore in the above described servo area is preferably shifted by half a period with respect to the period of pores perpendicular to the track direction of the data area.

The above described servo area is preferably constructed of at least two types of periodic array structures.

Furthermore, the present invention is a method of manufacturing a structure in which a plurality of pore periodic array structures formed in an anodized oxide film having different periods are arranged adjacent to one another, comprising (1) a step of forming pore starting points made up of a plurality of types of periodic arrays on the surface of a substrate comprised of aluminum as a principal component and (2) a step of anodizing the above described substrate simultaneously at the same anodization voltage.

The plurality of periodic array structures having different periods are preferably arranged adjacent to one another and there are at least two pores in the shared region which is the boundary thereof.

The plurality of periodic array structures having different periods preferably have at least one pore in addition to the pores in the above described shared region.

A voltage applied during anodization of the structure of the above described plurality of periodic arrays is preferably A [V] (B [nm]=A [V]/2.5 [V/nm], where B is a numerical value included within the range between a maximum value and a minimum value of the distance between the most proximate pores included in the above described plurality of types of periodic array structures).

The above described step (1) is preferably formed by an optical lithography, X-ray lithography, electron beam lithography, ion beam lithography, imprint lithography or scanning prove microscopy (SPM) lithography.

Furthermore, the present invention is a structure characterized by being manufactured using the above described method.

The present invention will be explained in detail below.

The structure of the present invention includes a nano structure as a typical example thereof, and therefore the nano structure will be explained.

The nano structure according to the present invention is a structure with a periodic array of pores formed in an anodized oxide film and array structures with a plurality of types of periods are arranged adjacent to one another.

The pores according to the present invention include pores filled with a material after those pores are formed.

The method of manufacturing the nano structure of the present invention consists of forming desired pore starting points made up of a plurality of periodic array structures on the surface of a substrate comprised of aluminum as a principal component using a lithographic method, etc., and applying anodization to these pore starting points at an appropriate applied voltage. The structure formed with the distance between most proximate pores of the periodic array structures limited to 0.75B to 1.5B (where B is a numerical value [nm] included within the range between a maximum value and a minimum value of the distance between the most proximate pores of the plurality of types of periodic array structures) allows a batch of anodization at a single voltage. Here, the nano structure refers to a structure having a shape variation or composition variation with the period of the concavo-convex structures being 1 µm or less.

The nano structure of the present invention is a structure with a periodic array of pores formed in an anodized oxide film and is a structure in which a plurality of periodic arrays having different periods are arranged adjacent to one another. Furthermore, there are at least two pores in a shared region which is the boundary of the adjacent periodic arrays and there is at least one pore in addition to the pores in the shared region. The distance between the most proximate pores of the periodic array structures is preferably 0.75B to 1.5B (where B is a numerical value included within the range between a maximum value and a minimum value of the plurality of periods). For example, when pore starting points made up of a hexagonal lattice having a period of 200 nm is subjected to anodization with an anodization voltage of 40 V applied, because 40 V×2.5 [m/V]=100 nm, 40 V corresponds to the anodization voltage of a period of 100 nm, and therefore pores are also formed in areas where no pore starting points exist. Therefore, to perform a batch of anodization on array structures of a plurality of types of periods, the smaller the distance between most proximate pores of a plurality of types, the better, and the probability that pores may also be formed from places other than the pore starting points increases when the distance exceeds the range of 0.75B to 1.5B. For these reasons, the voltage in a batch of anodization (step (2)) is preferably calculated from the most proximate distances which are most numerous in the structure.

FIG. 1 is a plan view illustrating the nano structure of the present invention. For example, using a technique such as an optical lithography, pore starting points 1 of a plurality of periodic array structures 6 made up of a hexagonal lattice area 3, a rectangular lattice area 4 and a graphite-shaped lattice area 5 are formed on the surface of a substrate as shown in FIG. 1. At this time, periodic structures such that pores 2 located on the boundaries among a plurality of periodic array structures 6 are shared are arranged continuously. A normal anodization voltage is uniquely determined depending on the period of pores, but when pore starting points are formed, it is possible to obtain pores having the same period as the starting point period regardless of a certain degree of voltage shifts. That is, with pore starting points whose period varies only slightly, it is possible to actually form regularly arrayed high aspect pores in a short time without producing any disorder of arrays. As the method of forming starting points of pore formation, it is also possible to actually form dents on the surface of a film to be subjected to anodization or mask areas other than starting points. Or it is also possible to form an anodization film on a substrate having projections and depressions with predetermined periodicity and use projections and depressions reflecting the projections and depressions of the base as starting points.

BRIEF DESCRIPTION OF THE DRAWINGS

FIG. 3 is a schematic view illustrating a nano structure according to Embodiment 2 of the present invention.

BEST MODE FOR CARRYING OUT THE INVENTION

Figure 1:
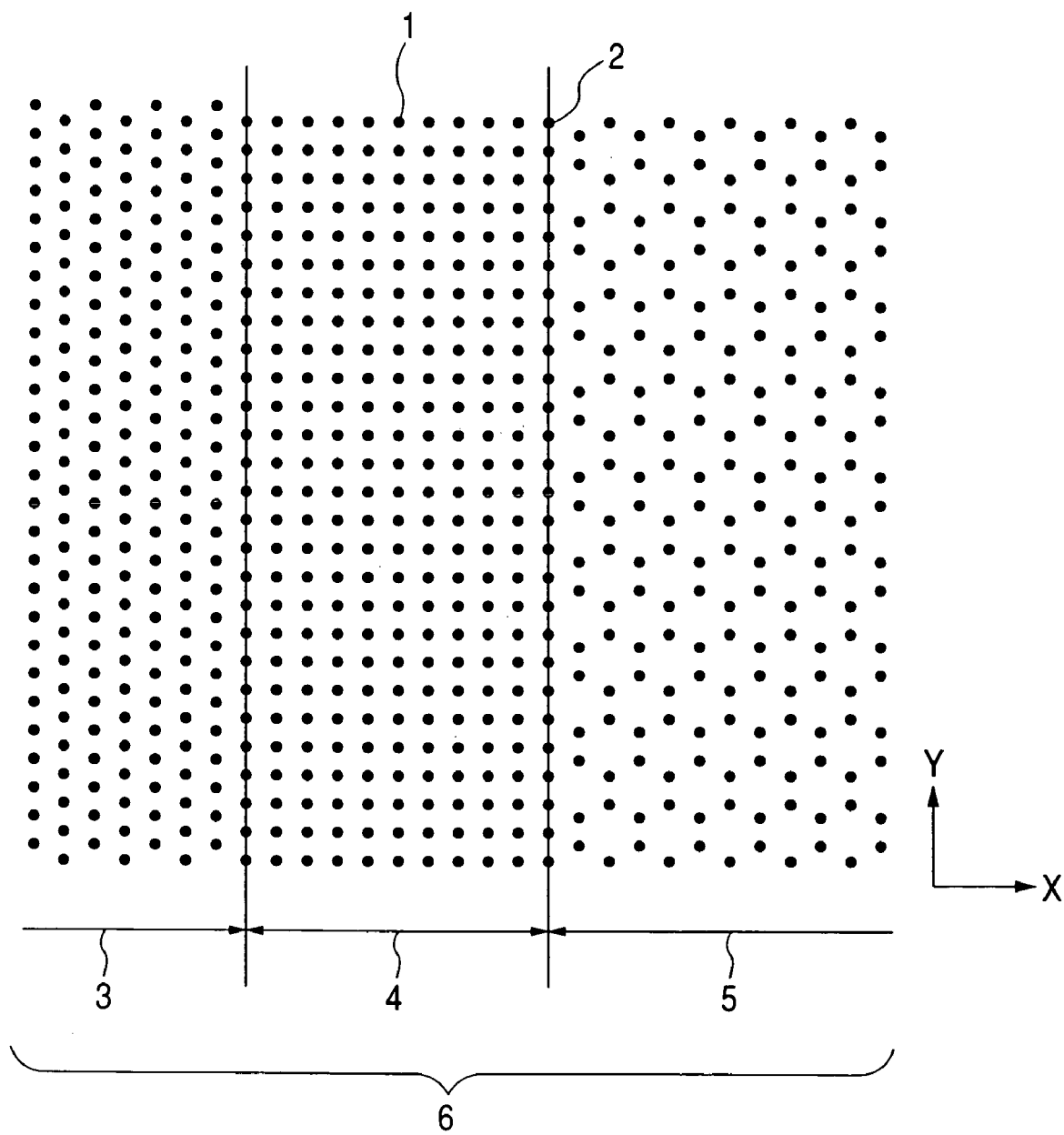
FIG. 1 is a plan view illustrating a nano structure of the present invention.

With reference now to the attached drawings, embodiments of the present invention will be explained in detail below. The same reference numerals will denote the same parts in all drawings.

Embodiment 1

Figure 2A:
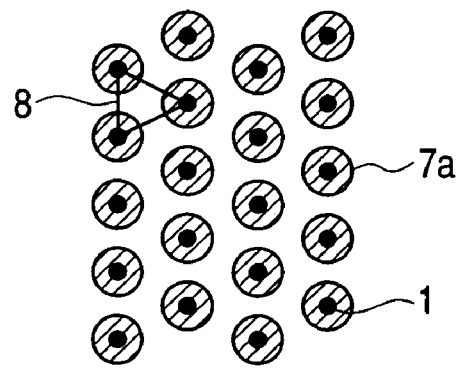
FIGS. 2A, 2B and 2C are plan views illustrating the nano structure of the present invention.
Figure 2B:
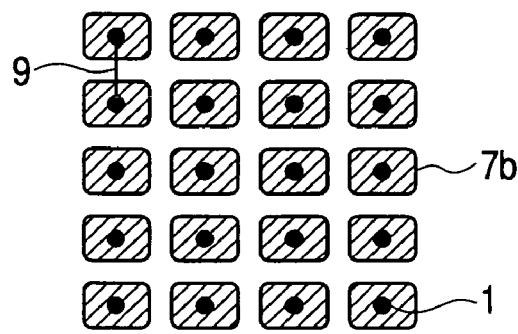
Figure 2C:
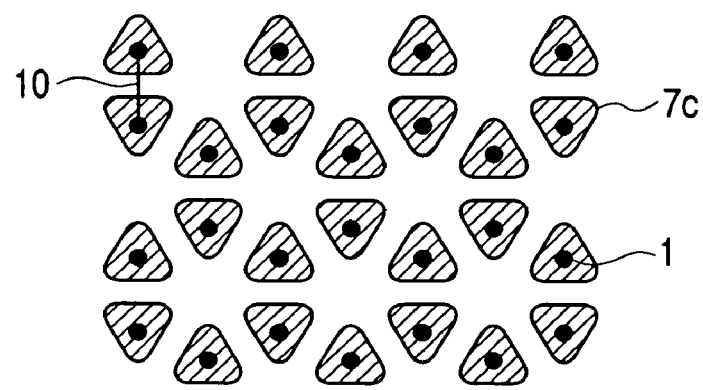

First, as step (2), concave structures having desired arrays are formed on the surface of a substrate on which an aluminum thin film is formed using an electron beam direct drawing method and these are used as pore starting points. As shown in FIG. 1, the array of pore starting points 1 consists of a hexagonal lattice area 3, a rectangular lattice area 4 and a graphite-shaped lattice area 5 affanged adjacent to one another and pores 2 on the boundary of the adjacent areas are shared by both areas. That is, the two adjacent areas share an away of pores with equal periodicity on the boundary. Black bullets 1 in FIGS. 2A to 2C indicate projected positions of pores on a plane of the hexagonal lattice area, rectangular lattice area and graphite-shaped lattice area in FIG. 1. In FIGS. 2A to 2C, a period 8 of the hexagonal lattice area 3 is 200 nm, a period 9 of the rectangular lattice area 4 in the Y direction is 200 nm, that of the X direction is 250 nm and the most proximate distance 10 of the graphite-shaped lattice area 5 is 200 nm. According to this structure, when B=200 nm that is minimum value in periods, the allowed periodic array structures are in the range of 150 nm to 300 nm, these are included in 0.75B to 1.5B.

Then, all the pore starting points formed in step (2) are subjected to anodization simultaneously at the same voltage. As the anodization voltage, a voltage [V] obtained by {basic period [nm]+2.5 [m/V]} is generally considered optimum. Since the most numerous most proximate distance is 200 nm, if the basic period (anodization period) is assumed to be 200 nm, the anodization voltage becomes 80 V. When a substrate is immersed in an aqueous solution of 0.3 mol/L phosphoric acid at 20° C. and anodization is applied using this as the anode with 80 V applied, then aluminum is oxidized and dissolved from the pore starting points and high aspect pores are formed.

Then, pore walls of aluminum oxide are dissolved in the aqueous solution of phosphoric acid and pore diameters are thereby expanded and controlled. FIGS. 2A, 2B and 2C show pores after the pore diameters are expanded. The shape of pore 7a in the hexagonal lattice area is substantially circular as shown in FIG. 2A, the shape of pore 7b in the rectangular lattice area is rectangular as shown in FIG. 2B and the shape of pore 7c in the graphite-shaped lattice area is triangular with no pores formed from areas without pore starting points through anodization under this condition, as shown in FIG. 2C.

Embodiment 2

As a magnetic device, pores with hexagonal lattice areas and rectangular lattice areas having the same period as that of Embodiment 1 which are repeatedly arranged adjacent to one another are formed. FIG. 3 shows arrays of pores. The method of formion is the same as that in Embodiment 1. Cobalt is charged into the pores formed by an electric plating method to convert the area to a magnetic recording area. In this magnetic device, a direction 13 is regarded as the track orientation and the magnetic device is used, divided into a servo area 11 and data area 12. Some magnetic substance cell groups in the servo area are half a period shifted from the period of the magnetic substance cell groups in the direction perpendicular to the track direction and this is effective for performing position control (called "off track") of the head and tracks. This prevents information of the adjacent tracks from being mistakenly reproduced or information from being overwritten on the already recorded adjacent tracks. Reducing the servo area through these arrays makes it possible to secure the data area and realize a much higher density. In FIG. 3, reference numeral 14 denotes pores in the shared region.

Embodiment 3

Figure 4:
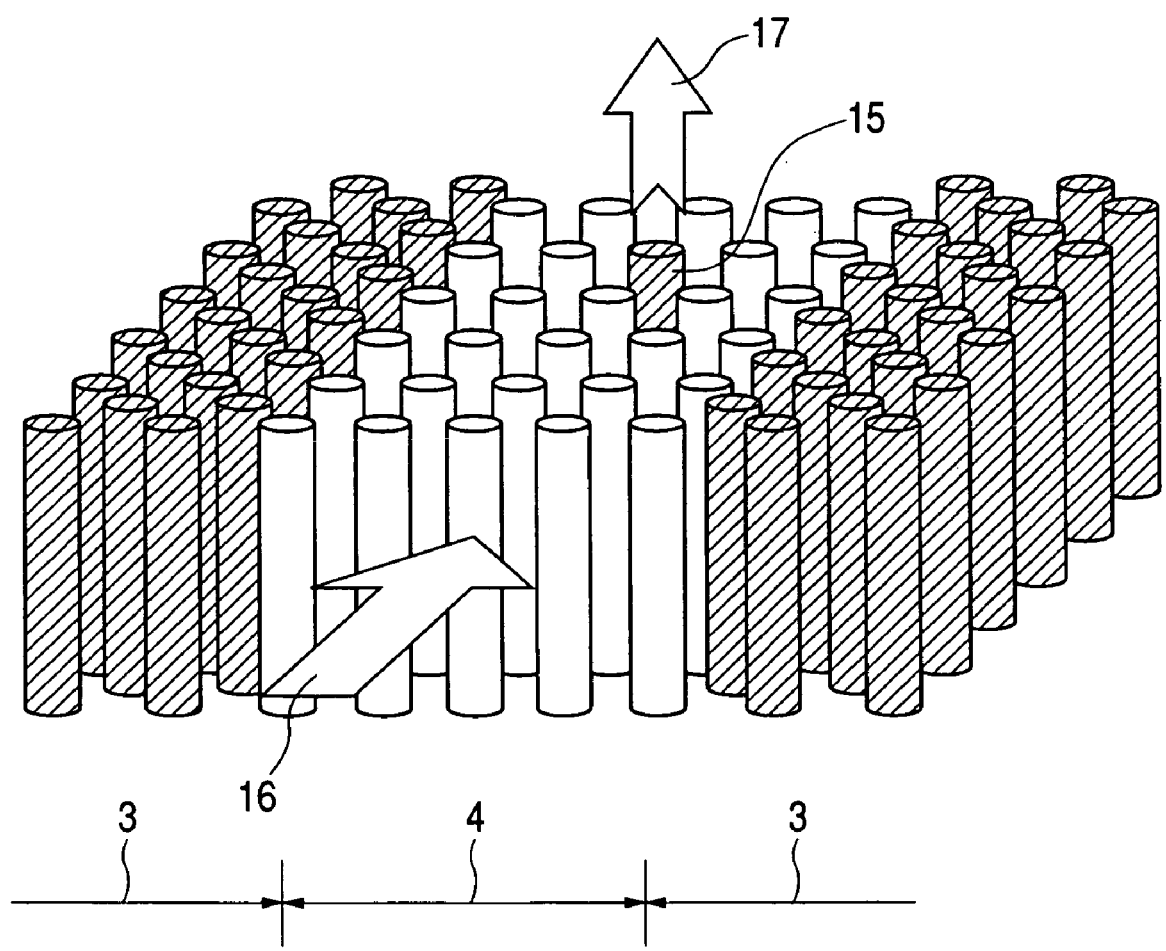
FIG. 4 is a perspective view illustrating a nano structure of according to Embodiment 3 of the present invention.

As a device, pores with hexaganol lattice areas arranged on both sides of a rectangular lattice area formed. The method of formation is the same as that of Embodiment 1 and then polystyrene with light-emitting pigment is charged into the pores. Since the photonic band structure of the rectangular lattice area is different from that of the hexagonal lattice area, wavelengths which are easily guided vary depending on their respective structures. For this reason, when light wave which propagates through the rectangular lattice area but does not propagate through the hexagonal lattice area is introduced into the pores in the rectangular lattice area in the vertical direction 16 (see FIG. 4) and if this structure is regarded as a light waveguide, the rectangular lattice area becomes a core and the hexagonal lattice area becomes a cladding and light wave propagates with lower loss compared with a normal two-dimensional light waveguide. Filling arbitrary pores in the core area with a light-emitting pigment makes it possible to excite and make propagate light waves with different wavelengths and this is applicable to an optical device. In FIG. 4, reference numeral 15 denotes a light-emitting material and 17 denotes a light-emitting direction.

As described above, the present invention can provide a nano structure having pore array structures in which a plurality of periodic arrays are arranged adjacent to one another.

Furthermore, the present invention can provide a method of manufacturing a nano structure in which a plurality of periodic arrays are formed adjacent to one another in a short time by applying anodization to pore starting points formed on a substrate all together at an anodization voltage.

Furthermore, the present invention can provide an optical device with the pores having the nano structure filled with a dielectric having a dielectric constant.

Furthermore, the present invention can provide a light-emitting device with the pores having the nano structure filled with a light-emitting material.

Furthermore, the present invention can provide a magnetic device with the pores having the nano structure filled with a magnetic material.

Furthermore, the present invention can provide a magnetic recording medium capable of constructing an effective servo area by filling the pores having the nano structure with magnetic substance and providing a plurality of periodic array structures in the servo area.

The invention claimed is:

1. A structure comprising a first area including a plurality of pores arranged in a lattice structure that is one of (a) a hexagonal lattice, (b) a rectangular lattice, and (c) a graphite-shaped lattice, and a second area including a plurality of pores arranged in a lattice structure that is a different one of (a), (b), and (c), wherein the first area and the second area share a plurality of pores at a boundary of the lattice structure of the first area and the lattice structure of the second area, and wherein the first area's pore interval is the same as the second area's pore interval.

2. A structure comprising periodic away structures of pores formed in an anodized oxide film, wherein a plurality of types of periodic away structures are arranged adjacent to one another including (i) a first structure that is one of (a) a hexagonal lattice, (b) a rectangular lattice, and (c) a graphite-shaped lattice, and (ii) a second structure that is a different one of (a), (b), and (c), wherein the first structure and the second structure have pores in common on a boundary therebetween, and wherein in an area occupied by the first structure and in an area occupied by the second structure, the pore interval is the same.

3. The structure according to claim 2, wherein the first structure and the second structure have at least one pore in addition to the pores in common.

4. The structure according to claim 2, wherein the first structure and the second structure each have equal distances between first proximate pores or have the distance between first proximate pores on one side equal to the distance between second proximate pores on the other side or have equal distances between second proximate pores.

5. The structure according to claim 4, wherein the distance between the most proximate pores of each of the first structure and the second structure is 150 nm to 300 nm.

6. The structure according to claim 2, wherein said anodized oxide film is comprised of aluminum as a principal component.

7. The structure according to claim 2, wherein at least one of said pores includes a filler.

8. The structure according to claim 7, wherein said filler is (a) a dielectric having a dielectric constant different from that of said anodized oxide film, (b) a semiconductor, (c) a magnetic material, or (d) a light-emitting material.

9. An optical device wherein said pores of the structure according to claim 2 are filled with a dielectric having a dielectric constant different from that of said anodized oxide film.

10. A light-emitting device wherein said pores of the structure according to claim 2 are filled with a light-emitting material.

11. A magnetic device wherein said pores of the structure according to claim 2 are filled with a magnetic material.

12. A magnetic recording medium comprising:

a data area where pores filled with magnetic material to record information; and a servo area where track positions are detected, wherein said data area comprises pores arranged in a structure that is one of (a) a hexagonal lattice, (b) a rectangular lattice, and (c) a graphite-shaped lattice, wherein said servo area comprises pores arranged in a structure that is a different one of (a), (b), and (c), wherein said data area's structure and said servo area's structure have pores in common at a boundary therebetween, and wherein said data area's pore interval is the same as said servo area's pore interval.

13. The magnetic recording medium according to claim 12, wherein at least one pore in said servo area is shifted by half a period with respect to a period of pores perpendicular to the track direction in the data area.

14. A magnetic recording medium according to claim 12, wherein said servo area is constructed of at least two types of periodic array structures.

15. A method of manufacturing a structure in which a plurality of pore periodic array structures formed in an anodized oxide film having different periods are arranged adjacent to one another, said method comprising:

(1) a step of forming pore starting points made up of a plurality of types of periodic arrays on the surface of a substrate comprised of aluminum as a principal component; and (2) a step of anodizing said substrate's pore starting points simultaneously at the same anodization voltage, wherein the plurality of pore periodic array structures comprise (i) a first structure that is one of (a) a hexagonal lattice, (b) a rectangular lattice, and (c) a graphite-shaped lattice, and (ii) a second structure that is a different one of (a), (b), and (c), wherein the first structure and the second structure have pores in common on a boundary therebetween, and wherein in an area occupied by the first structure and in an area occupied by the second structure, the pore interval is the same.

16. The method of manufacturing a structure according to claim 15, wherein the first structure and the second structure have at least one pore in addition to the pores in common.

17. The method of manufacturing a structure according to claim 15, wherein a voltage applied during anodization of the structure of said plurality of periodic arrays is A volts, and wherein the following condition is satisfied:

B=A/(2.5 volts/nanometer)

where B is within the range between a maximum value and a minimum value of the distance between the most proximate pores included in said plurality of pore periodic array) structures.

* * * * *